June 26, 1956  J. F. JOY  2,752,140
MINING AND LOADING APPARATUS
Filed Sept. 25, 1951  9 Sheets-Sheet 3

Inventor:
Joseph F. Joy.
by Charles F. Osgood,
Attorney.

June 26, 1956    J. F. JOY    2,752,140
MINING AND LOADING APPARATUS
Filed Sept. 25, 1951    9 Sheets-Sheet 4

Inventor:
Joseph F. Joy.
By Charles F. Osgood,
Attorney.

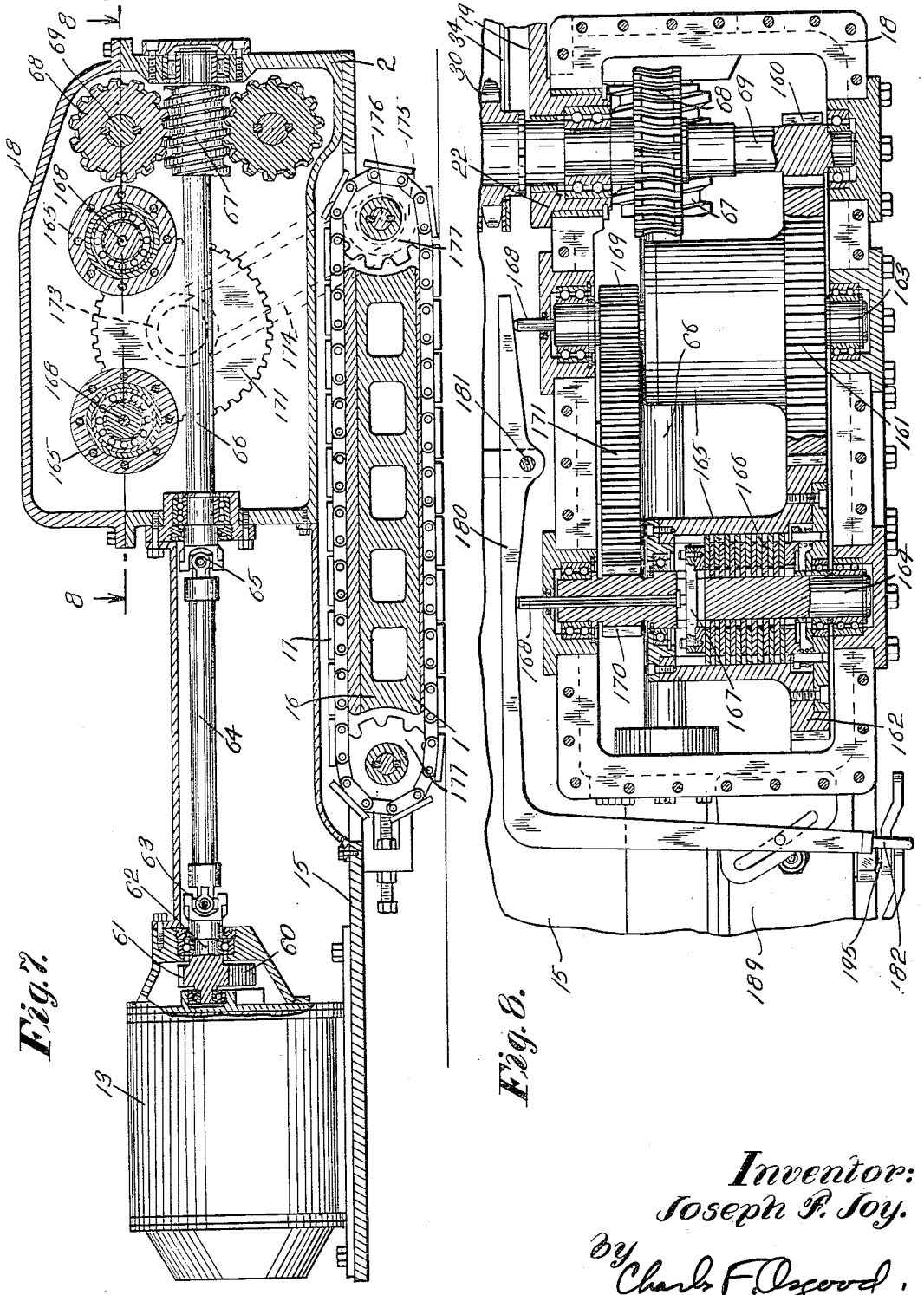

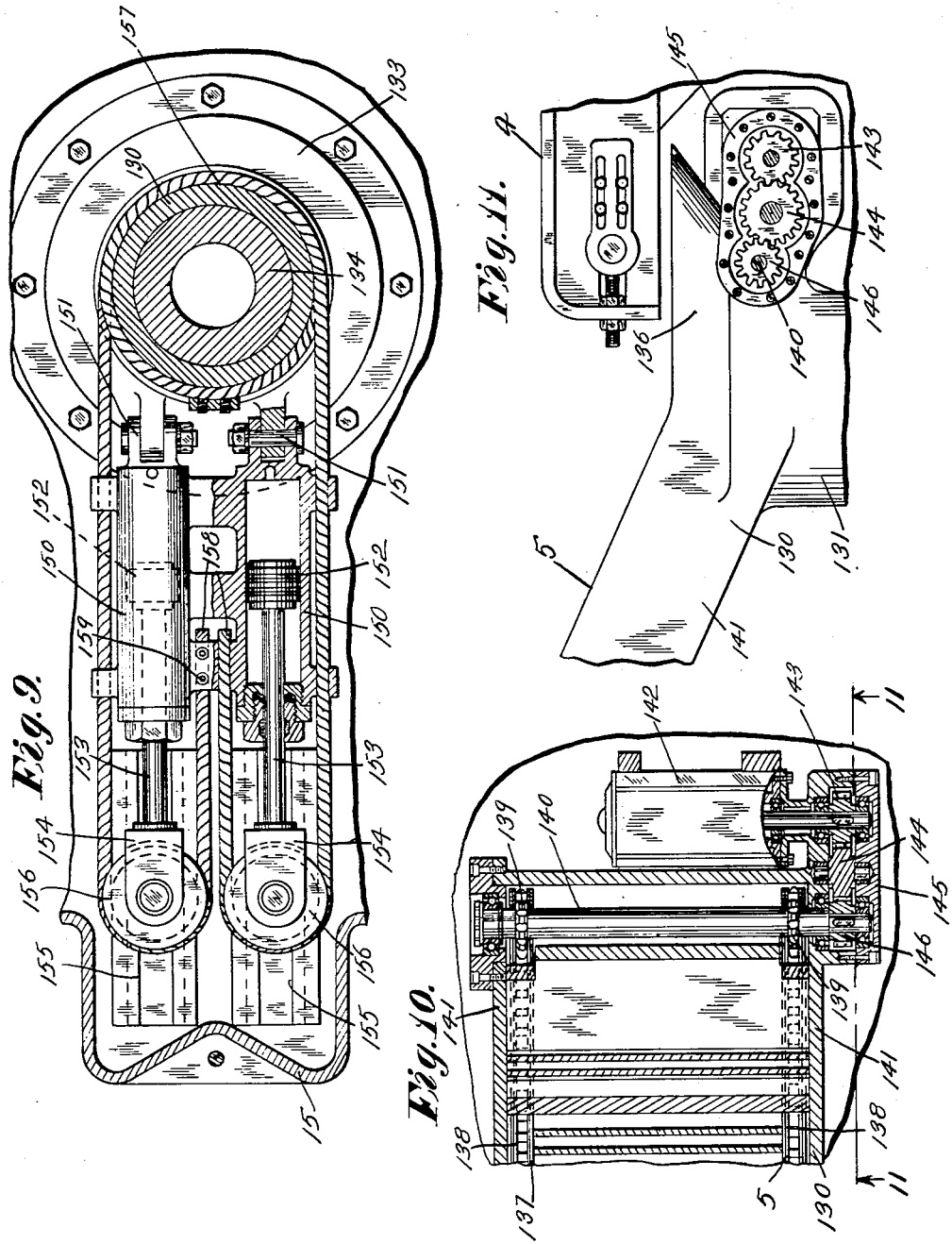

June 26, 1956  J. F. JOY  2,752,140
MINING AND LOADING APPARATUS
Filed Sept. 25, 1951  9 Sheets-Sheet 7
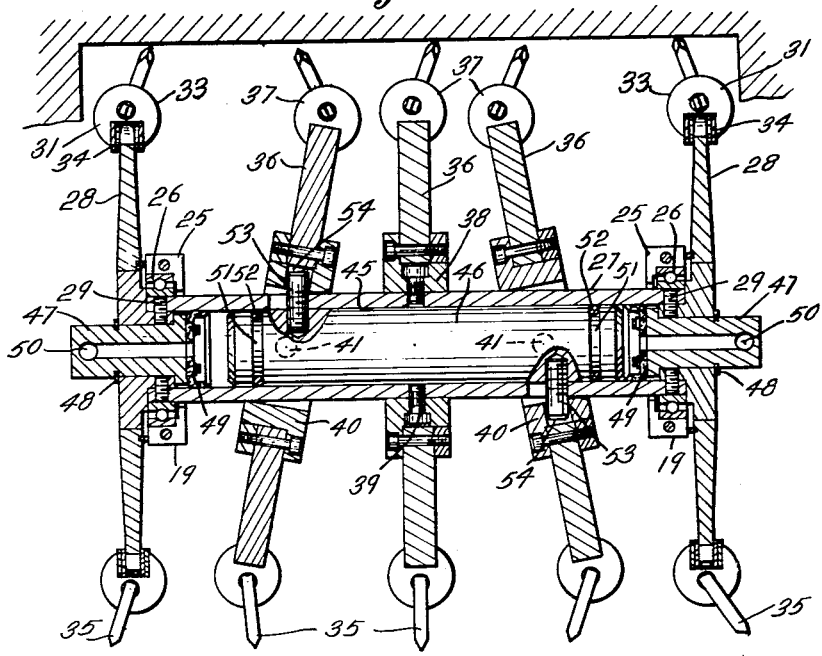
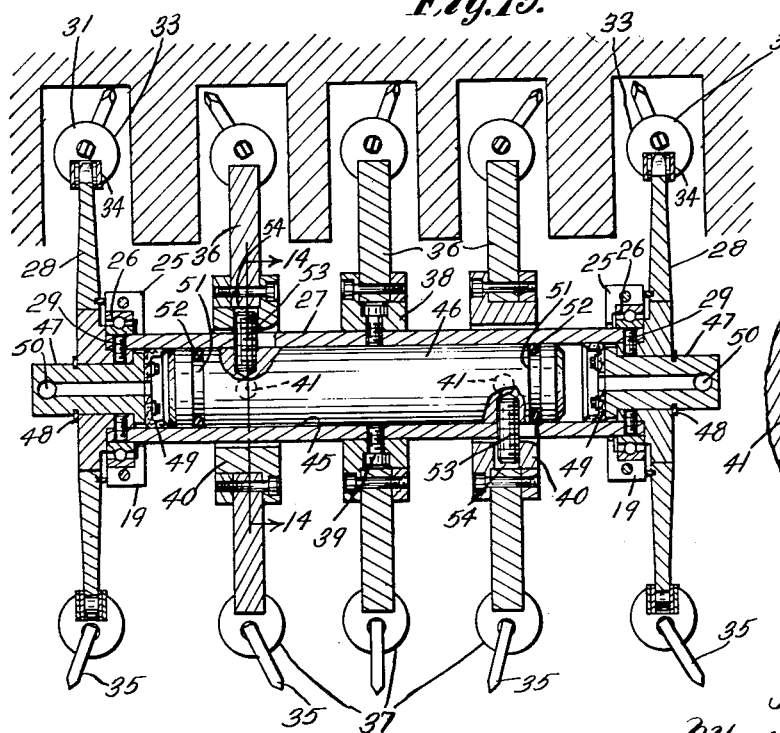
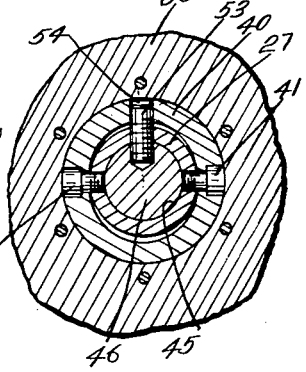
Inventor:
Joseph F. Joy.
by Charles F. Osgood.
Attorney.

June 26, 1956 J. F. JOY 2,752,140
MINING AND LOADING APPARATUS
Filed Sept. 25, 1951 9 Sheets-Sheet 8

Inventor:
Joseph F. Joy.
by Charles F. Osgood,
attorney.

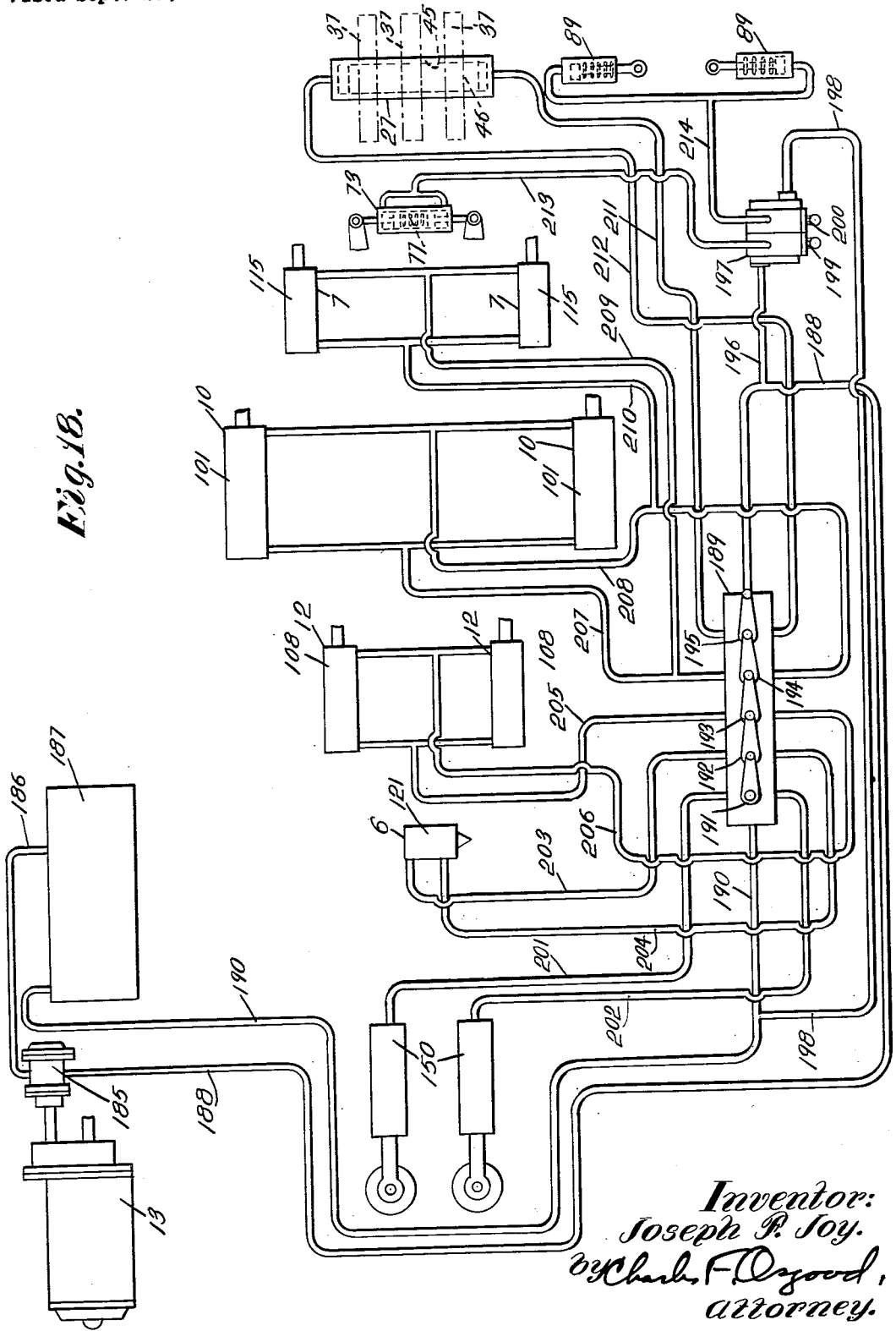

United States Patent Office 2,752,140
Patented June 26, 1956

2,752,140

MINING AND LOADING APPARATUS

Joseph F. Joy, Pittsburgh, Pa., assignor to Joy Manufacturing Company, Pittsburgh, Pa., a corporation of Pennsylvania Application September 25, 1951, Serial No. 248,154

28 Claims. (Cl. 262—9)

This invention relates to a mining and loading apparatus and more particularly to an apparatus for mining mineral from a solid mine vein and for loading out the dislodged mineral in a substantially continuous manner.

In certain known types of continuous mining apparatus a vein disintegrating mechanism is provided having orbitally movable disintegrating elements for dislodging and disintegrating the mineral of a solid mine vein, and during the disintegrating operation a quantity of disintegrated mineral flows rearwardly and falls to the floor and must be cleaned up from the floor before the apparatus is advanced. Also, in known forms the orbitally movable disintegrating elements frequently form cores of mineral attached to the solid vein and some difficulty has been encountered in preventing such coring, or in dislodging the cores when they are formed. Certain of such known types of continuous miners lack the desired flexibility and maneuverability, are comparatively unwieldy and cumbersome in operation and also lack the desired free flow of the disintegrated mineral toward the conveying means of the apparatus. The present invention contemplates improvements over such known types of continuous mining apparatus in that an improved mining and loading apparatus is provided especially designed for use in the continuous mining of mineral from a solid vein and embodying novel features of construction by which the disadvantages of such known types of apparatus, as above outlined, are substantially overcome. The apparatus of the present invention is extremely flexible in operation and is of relatively small dimensions whereby maneuverability is greatly enhanced. The disintegrating head mechanism of the present invention embodies a novel form of core breaking means whereby the cores formed by the orbitally moving cutting and disintegrating elements may be readily dislodged, and improved shrouding means is provided in association with the disintegrating head mechanism which confines the disintegrated mineral within the apparatus and directs it toward the conveying means thereby eliminating the need of a separate floor clean-up means. The disintegrating head mechanism of the present invention is sumped in at the roof and is swung downwardly during the disintegrating operation thereby facilitating the swinging and disintegrating function, and due to the novel structural arrangements provided, including the disposition of the motors on the frame structure rearwardly of the base, the apparatus is well balanced, thereby presenting little tendency to tipping during head swing. The apparatus of the present invention is not only relatively efficient in operation and well balanced but is also rugged, low in height, and compact in design, well adapted for its intended purpose.

An object of the present invention is to provide an improved mining and loading apparatus especially designed for use in the continuous mining of mineral from a solid mine vein. Another object is to provide an improved mining and loading apparatus having an improved disintegrating head mechanism for dislodging and disintegrating the mineral of a solid mine vein and embodying orbitally movable disintegrating elements for cutting parallel kerfs or slots in the mineral and having improved means for dislodging the cores of mineral formed between the slots as cutting progresses thereby efficiently to effect disintegration of the mineral. Yet another object is to provide improved shrouding or housing means associated with the disintegrating head mechanism whereby flying mineral is minimized and any substantial amount of disintegrated mineral is prevented from falling to the floor thereby eliminating the need of a separate floor clean-up means. A further object is to provide an improved continuous miner which is extremely rugged and compact, comparatively light in weight and well balanced, and readily maneuverable. A still further object is to provide an improved disintegrating head mechanism embodying disintegrating elements movable in parallel orbits for forming cores of mineral attached to the solid vein and having improved means for modifying the location of the orbital paths of certain of such disintegrating elements to cause the latter to wobble whereby the cores of mineral may be readily dislodged. Yet another object is to provide an improved disintegrating head mechanism embodying a series of parallel rotary disintegrating members and associated means for tilting certain of said rotary members out of parallelism with the others to effect a core breaking function. Still another object is to provide an improved swingable disintegrating head mechanism which may be sumped into the mineral at the roof and may be swung downwardly during the disintegrating operation, thereby substantially to reduce the power consumed during disintegration of the mineral. A further object is to provide an improved mining and loading apparatus having novel arrangements and combinations of parts. These and other objects and advantages of the invention will, however, hereinafter more fully appear.

In the accompanying drawings there is shown for purposes of illustration one form which the invention may assume in practice.

In these drawings:

Figs. 1 and 1a, taken together, constitute a plan view of a mining and loading apparatus constructed in accordance with a preferred illustrative embodiment of the invention.

Figs. 2 and 2a, taken together, constitute a side elevational view of the apparatus shown in Figs. 1 and 1a.

Fig. 6 is a central longitudinal vertical section taken on line 6—6 of Fig. 1a.

Fig. 7 is a longitudinal vertical section taken on line 7—7 of Figs. 1 and 1a.

Fig. 8 is an enlarged horizontal section taken on line 8—8 of Fig. 7.

Fig. 9 is a horizontal section taken on line 9—9 of Figs. 4 and 6, showing the swing cylinder mechanism for the tail conveyor.

Fig. 10 is an enlarged horizontal section taken on line 10—10 of Fig. 4.

Fig. 11 is a detail vertical section taken on line 11—11 of Fig. 10.

Fig. 12 is an enlarged cross section taken on line 12—12 of Fig. 1, illustrating a portion of the disintegrating head mechanism and showing the parts in core breaking position.

Fig. 13 is a cross section similar to Fig. 12, showing the parts in core cutting and disintegrating position.

Fig. 14 is a detail vertical section taken on line 14—14 of Fig. 13.

Fig. 18 is a diagrammatic view illustrating the hydraulic fluid system.

Figure 1:
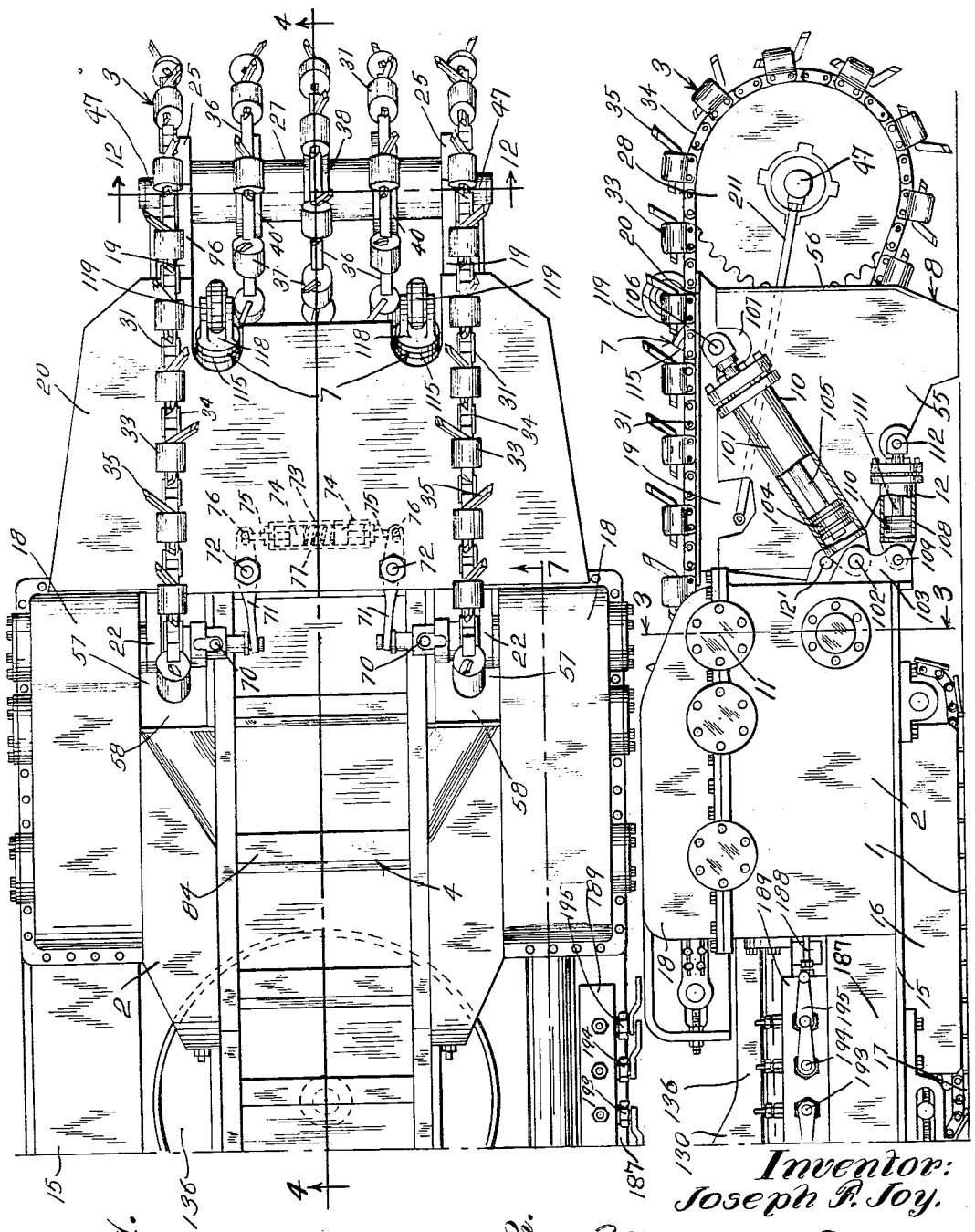

The improved mining and loading apparatus, as shown in the drawings, generally comprises a mobile base 1 on which a horizontal frame structure 2 is rigidly mounted to turn horizontally with the base and carried at the front overhanging end of this frame structure is a mining instrumentality in the form of a mine vein disintegrating head mechanism, generally designated 3. Front elevating conveying means 4 extends lengthwise of the frame structure 2 with its forward portion in adjacency with the head mechanism for receiving the disintegrated mineral and for conveying such mineral rearwardly to discharge onto a tail conveyor 5 which in turn conveys the mineral rearwardly to a suitable point of delivery at the extreme rear end of the apparatus. A central floor jack 6 serves to center the base during horizontal turning of the frame structure 2 and suitable roof jacks 7 are engageable with the mine roof for guiding the head mechanism during the sumping operation. A front housing or shrouding means, generally designated 8, cooperates with the disintegrating head mechanism for confining the disintegrated mineral within the apparatus and provides a front floor engaging pan 9 for directing such mineral rearwardly toward the front conveying means. Power jacks 10 serve to swing the disintegrating head mechanism in vertical planes about a horizontal pivot 11 and similar power jacks 12 serve to tilt the housing or shrouding means about its pivot 12' on the frame structure 2 to elevate the conveyor pan. Motors 13 mounted on the frame structure at the rearward portion of the base serve to drive the disintegrating head mechanism, the front conveying means 4, the propelling means for the base and the pump for supplying liquid under pressure to the several hydraulically operated devices of the apparatus. The novel disposition of the motors on the frame structure 2 rearwardly of propelling means of the base enables substantial counterbalancing of the disintegrating head mechanism 3 and, thereby reduces the tendency to tipping during the disintegrating operation. The apparatus is adapted to disintegrate the mineral of a solid mine vein by dislodging a series of vertical segments successively across the face of the vein and the dislodged mineral is disintegrated and moved onto the front conveying means 4 in a substantially uninterrupted manner.

Figures 3, 4:
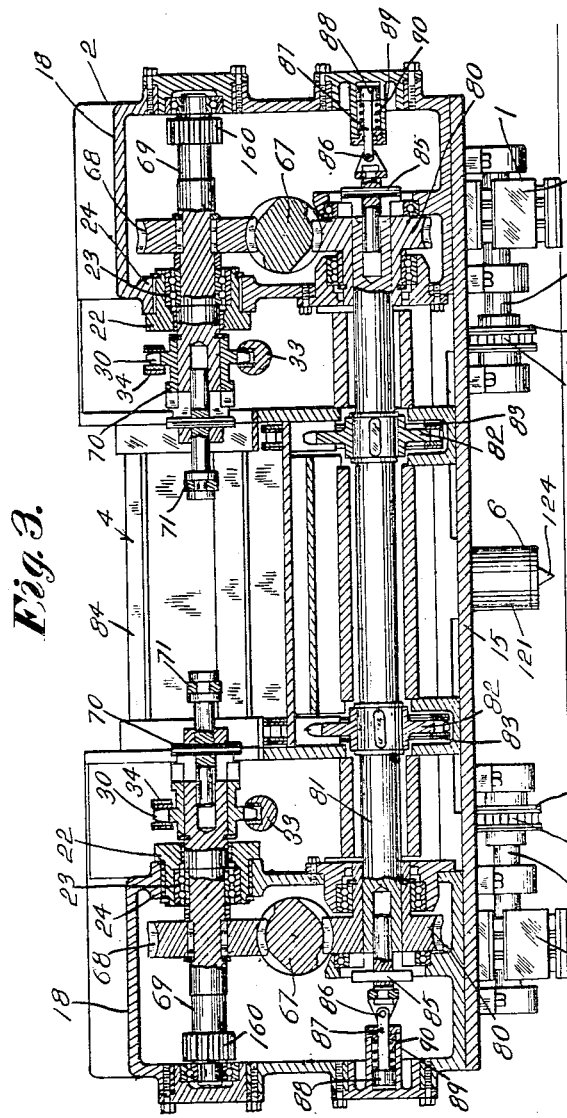
Fig. 3 is an enlarged cross section taken on line 3—3 of Figs. 2 and 4.
Fig. 4 is a central longitudinal vertical section taken on line 4—4 of Fig. 1.

More specifically, the improved mining and loading apparatus consists of a crawler tread mechanism which provides the mobile base, and a base frame 15 has side frames 16 about which endless crawler treads 17 are guided for orbital circulation. The frame structure 2 mounted on the base frame has vertical side housings or gear casings 18, and the front conveying means 4 extends longitudinally forwardly and downwardly between these housings, as shown in Figs. 1 and 3, with its forward receiving portion extending along the bottom of the shrouding means 8 providing the front conveyor pan and extending forwardly between the sides of the disintegrating head mechanism. The frame structure 2 overhangs the front end of the base and is rigidly secured to the base so that the frame structure may be turned horizontally only when the base is turned under the control of the crawler treads. This manner of effecting turning of the frame structure provides an extremely low-height structure. The disintegrating head mechanism is pivotally mounted on the front end of the frame structure 2 to swing in vertical planes about its pivot 11, and comprises vertical side frames or plates 19 which carry a transverse upper plate 20 and which are rigidly connected in spaced parallel relation by cross frame members 21 (Fig. 4). These side frame members 19 have rear hub or bearing engaging portions 22 (see also Fig. 3) journaled in bearings 23 carried by bearing supports 24 at the inner walls of the side housings 18. The forward portions of the vertical side frames 19 have split bearing caps 25 held in position as by screws and holding anti-friction bearings 26 in position on the side frames with their outer races held firmly in place, and journaled in these bearings is a front cross shaft 27 of tubular formation. Coaxial sprockets 28 are arranged at the outer sides of the frames 19 with their hubs rigidly secured at 29 to the opposite ends of the cross shaft. Drive sprockets 30 coaxial with the pivot 11 of the head mechanism engage endless side cutter or disintegrating chains 31 which pass around the sprockets 28 in such manner that the front cross shaft 27 is driven by the sprockets 30 through the side chains 31 and the sprockets 28. These side cutter chains are of the pivoted link type having cutter blocks 33 pivotally connected by strap links 34, and the cutter blocks carry disintegrating elements such as cutter bits 35. Arranged coaxial with the drive sprockets 28 and the shaft 27 are cutter wheels or disks 36 carrying similar cutter blocks 37 and having their hubs suitably mounted on the cross shaft, as shown in Fig. 13. The central wheel has its hub 38 rigidly secured as by screws 39 to the cross shaft and the sprockets 28 and the central wheel are maintained in parallel longitudinal vertical planes. The intermediate cutter wheels have their hubs 40 pivotally mounted on diametrically opposite pivot pins 41 secured to the cross shaft to rock in relatively opposite directions into inclined positions out of parallelism with the side chain sprockets and the central wheel, as shown in Fig. 12. To accomplish such tilting of the intermediate wheels, the tubular cross shaft 27 provides a cylinder having a bore 45 containing a reciprocable piston 46. Secured to the side frames 19 are end members 47 held in place by conventional split rings 48 and having packed head portions 49 fitting the end portions of the shaft bore 45 to prevent fluid leakage and these members are formed with flow passages 50. The end portions of the piston 46 are exteriorly grooved at 51 to receive sealing rings 52 likewise sealingly engaging the bore walls. Projecting from the piston at its opposite sides are radial pins 53 which are spaced apart axially of the piston in the manner shown and these pins are engaged in recesses 54 in the hubs of the intermediate wheels. Thus, when liquid under pressure is properly supplied to the passages 50 of the left-hand member 47, as viewed in Fig. 13, the piston 46 is moved to the right to effect tilting of the intermediate wheels into the oppositely inclined positions shown in Fig. 12. When liquid under pressure is supplied to the passage 50 of the right-hand member 47, and the opposite end is vented, the piston is moved to the left, back to the initial position shown in Fig. 13 to bring the intermediate wheels into parallelism with the end cutters and the central wheel. By trapping liquid within the shaft bore 45, the piston is held against axial movement thereby to lock the wheels in parallelism.

As the disintegrating head mechanism is swung downwardly the side plates 19 of the cutter frame move in between the vertical sides 55 of the shrouding means 8 and cooperate with the latter to direct the disintegrated mineral into the hopper-like space provided so that the mineral is directed without substantial spillage toward the front conveying means 4. The vertical sides of the shrouding means have forward surfaces 56 which are disposable into adjacency with or even against the face of the mine vein when the disintegrating head mechanism is sumped into the mineral vein, as later explained. The bottom pan 9 of the shrouding means has upper longitudinal surfaces 57 extending longitudinally at the opposite sides of the conveying means 4, and the side cutter chains 31, when the head mechanism is lowered, cooperate with these side surfaces to convey the disintegrated mineral rearwardly to discharge at 58 onto the conveying means rearwardly of the head pivot, as shown in Figs. 1 and 4. The bottom pan 9 has a forward penetrating edge 59 disposable at the floor level, as shown in Fig. 4. Thus, any loose mineral which may accumulate within the shrouding means may be moved onto the conveying means by the disintegrating head mechanism as the latter approaches its lowered position.

The motors 13 are herein desirably electric motors and have pinions 60 (Fig. 7) secured to the forward ends of their power shafts and these pinions mesh with spur gears 61 secured to longitudinal shafts 62 suitably journaled in bearings supported within the front motor housings. The shafts 62 are coupled by universal joints 63 to longitudinal shafts 64 which are in turn connected by universal joints 65 to longitudinal shafts 66 suitably journaled in bearings supported within the side housings 18, as shown in Fig. 7. Secured to these latter shafts are worms 67 (see also Fig. 3) meshing with and driving worm wheels 68 having their hubs keyed to aligned transverse shafts 69 arranged coaxially with the pivot 11 of the disintegrating head mechanism. These shafts are suitably journaled in bearings supported within the side housings 18, as shown in Fig. 3, and the inner ends of these shafts project inwardly from the inner sidewalls of the side housings through the cutter frame hubs 22 and the chain drive sprockets 30 are journaled on the projecting ends of these shafts in the manner shown. The sprockets 30 are connectible to the shafts 69 by conventional sliding clutches 70 which are operated in unison by shifter levers 71 pivoted at 72 on the cutter frame. A hydraulic cylinder 73 secured to the cutter frame transversely beneath the upper plate 20 contains relatively movable pistons 74 which have oppositely projecting piston rods 75 which are pivotally connected at their outer ends at 76 to the levers 71. Thus, when liquid under pressure is suitably supplied to the cylinder 73 at the remote sides of the pistons 74, the latter are moved toward one another to effect swinging of the levers 71 simultaneously to connect the clutches 70 and when liquid is vented from the cylinder, a coil spring 77 intermediate the pistons serves to force the latter apart to swing the levers 71 to effect concurrent release of the clutches.

As is also shown in Fig. 3, the worms 67 mesh with worm wheels 80 which are journaled on the remote ends of a transverse shaft 81 herein arranged parallel with the shaft 69 and likewise suitably journaled within the side housings 18. Keyed to the shaft 81 are chain sprockets 82 which engage and drive the side chains 83 of the endless flight conveyor 84 of the front conveying means 4, as shown in Fig. 4. The worm wheels 80 are connectible to the shaft 81 by conventional sliding clutches 85 which are pivotally connected at 86 to piston rods 87 of operating pistons 88 contained within aligned cylinders 89 suitably mounted at the outer sidewalls of the side housings 18. Springs 90 contained within the cylinders act on the pistons 88 to urge the same outwardly in opposite directions. When liquid under pressure is suitably supplied to the outer ends of the cylinders 89, the pistons 88 are moved inwardly toward one another to effect simultaneous connection of the clutches, and when liquid is vented from the cylinders, the springs move the pistons outwardly to effect concurrent release of the clutches.

In order to vary the tension of the side chains of the disintegrating head mechanism the vertical side frames 19 are made up of relatively adjustable parts and herein have longitudinal guideways 95 which slidingly receive guides 96 which carry the bearings for the cross shaft 27 and adjusting screws 97 are provided for adjusting the guides 96 along their guideways to move the cross shaft 27 longitudinally thereby to vary the distance apart of the axes of rotation of the sprocket wheels 28 and the drive sprockets 30. Clamping screws 98 pass through longitudinal slots in the guides for firmly clamping the guides in adjusted position.

Figure 2:
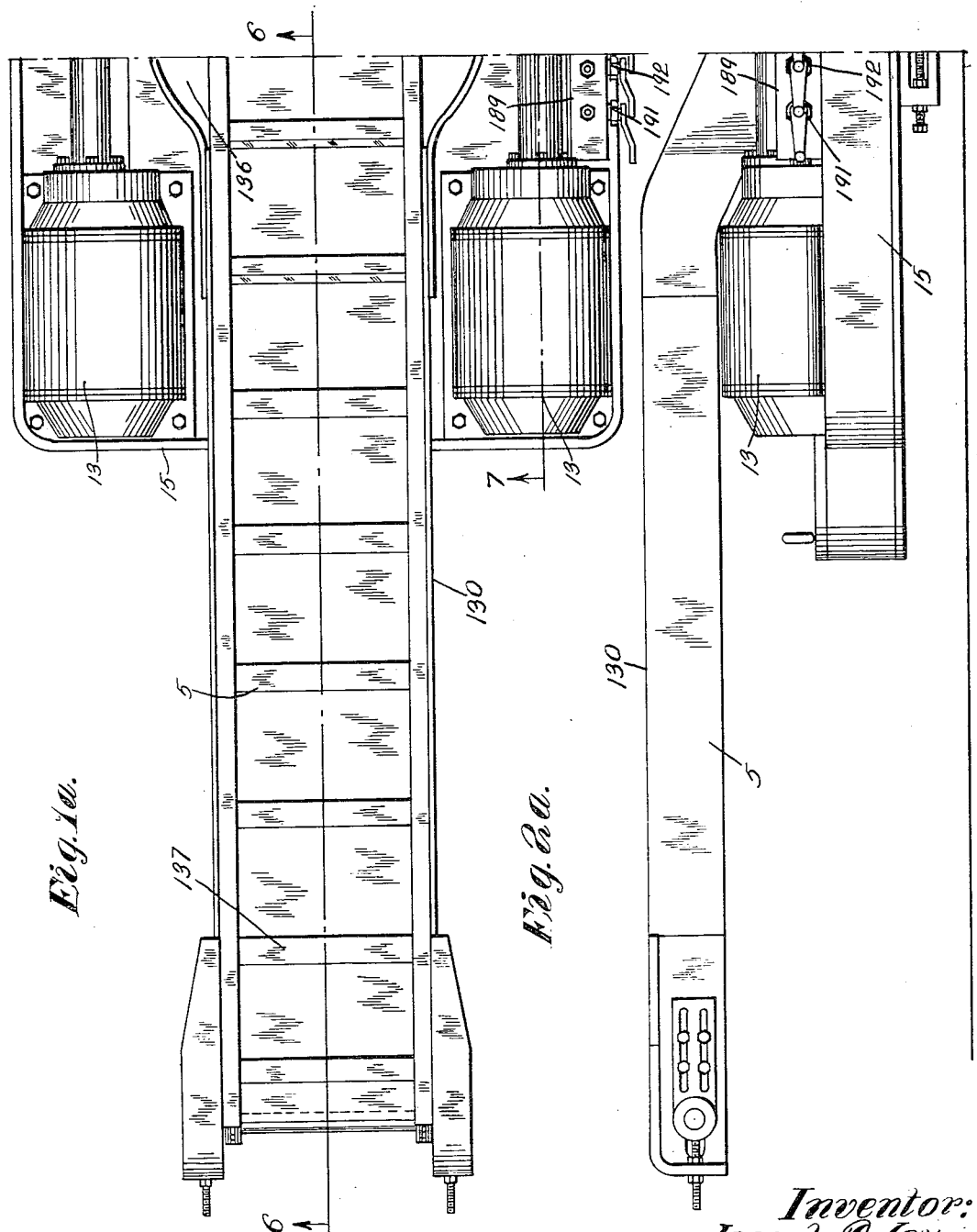

The power jacks 10 for swinging the disintegrating head mechanism in vertical planes about its pivot comprise jack cylinders 101 pivotally mounted at their lower ends at 102 on brackets 103 suitably secured to the front walls of the side housings 18, and reciprocable within these cylinders are pistons 104 having piston rods 105 pivotally connected at their upper ends at 106 to the sides of the vertical side plates 19 of the head frame. The side plates 55 of the shrouding means 8 are notched at 107 at their upper edges to receive the piston rod pivots 106 when the disintegrating head mechanism is in its lowered position, as shown in Fig. 2. The power jacks 12 for tilting the frame of the shrouding means comprise jack cylinders 108 pivoted at 109 on the brackets 103 and containing pistons 110 having their piston rods 111 pivotally connected at 112 to the lower portions of the side frames 55. Thus, by properly supplying liquid under pressure to the cylinders of these power jacks, the disintegrating head mechanism may be swung in vertical planes about its pivot and the frame of the shrouding means 8 may be tilted about its pivot, and by trapping the liquid within these jack cylinders the parts may be rigidly locked in adjusted position.

The roof jacks 7 comprise parallel upright cylinders 115 which, as shown in Fig. 4, are arranged within the frame of the head mechanism 3 and are rigidly secured to the upper plate 20 of the head frame and these cylinders contain pistons 116 having upwardly extending piston rods 117 which carry at their upper ends swiveled brackets 118 of caster wheels 119 engageable with the mine roof. The centrally located jack 6 for holding the base stationary as regards bodily movement during horizontally turning of the frame structure 2 comprises a vertical jack cylinder 121 secured to the base frame and containing a piston 122 having a downwardly extending piston rod 123 provided with a pointed lower end 124. When the disintegrating head mechanism is in position to sump at the roof level, liquid under pressure may be supplied to the jack cylinders 115 beneath the jack pistons to effect movement of the caster wheels 119 into engagement with the roof, for a purpose to be later explained. Normally, during operation of the apparatus, the caster wheels 119 are in their retracted position, close to the top of the head mechanism, as shown in Fig. 4. When liquid under pressure is supplied to the upper end of the cylinder 121 of the central floor jack, the piston may be moved downwardly to bring the pointed end of its piston rod into firm contact with the mine floor so that when the crawler treads of the crawler base are suitably operated the base may be turned about the vertical axis of the jack to effect swinging of the frame structure together with the disintegrating head mechanism horizontally into different radial operating positions. By trapping liquid within the roof and floor jack cylinders the jack pistons may be firmly locked in adjusted position.

Figure 6:
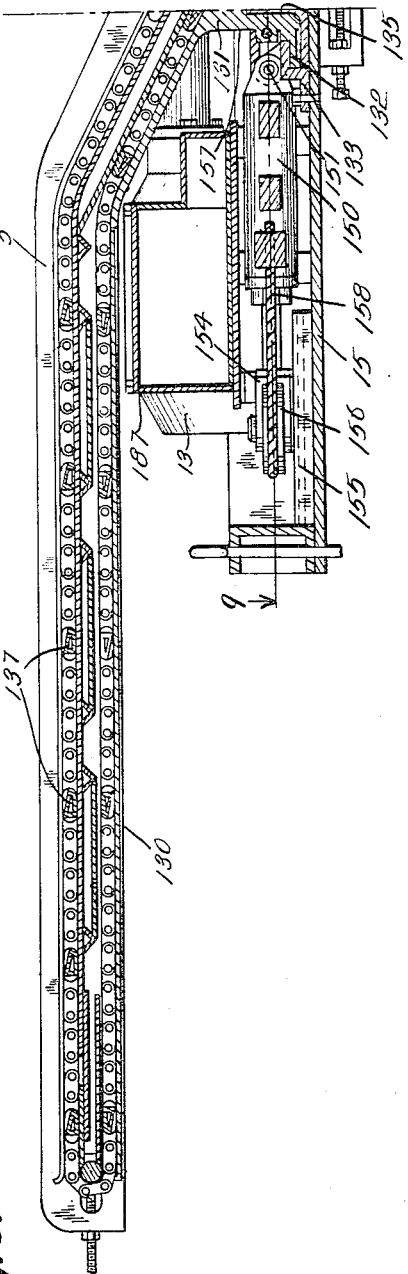

Now referring to the tail conveyor 5, it will be noted that a rear conveyor frame 130 has near its forward end a circular lower portion 131 provided with a radial flange 132 rotatably engaging an annular guide 133 secured as by screws to the base frame 15 (see Figs. 4 and 6). Carried by the base frame is an upstanding circular bearing member 134 which is received in a vertical bore 135 in the circular portion of the conveyor frame. Thus, a stable pivotal support is provided for the tail conveyor whereby the latter may swing horizontally through 180° into right-angle positions at either side of the base. The conveyor frame has a forward hopper portion 136 which underlies the rear discharge end of the front conveying means 4 and into which the front conveying means discharges. Guided for circulation along suitable guideways on the conveyor frame is an endless flight conveyor 137 having endless side chains 138, which pass around forwardly located drive sprockets 139 secured to a cross shaft 140 suitably journaled in bearings supported by the side plates 141 of the conveyor frame, as shown in Fig. 10. A motor 142, desirably an electric motor, mounted on the conveyor frame, has a spur pinion 143 keyed to its power shaft and this pinion meshes with an intermediate spur gear 144 journaled within a gear housing 145 secured to the adjacent side plate of the conveyor frame and this intermediate gear in turn meshes with and drives a spur gear 146 keyed to one end of the cross shaft 140. Thus, the tail conveyor may be driven by the motor 142 through the spur gear train and drive sprockets, independently of the front conveying means 4.

The swinging means for the tail conveyor comprises, as shown in Fig. 9, a pair of parallel longitudinally extending hydraulic cylinders 150 pivotally connected at 151 to lugs integral with the annular guide 133. Reciprocable in these cylinders are pistons 152 having piston rods 153 projecting rearwardly from the cylinders and carrying at their rearward ends brackets 154 suitably guided in parallel longitudinal guideways 155 and on which guide sheaves 156 are journaled. The circular portion 131 of the conveyor frame provides a cylindrical drum surface 157 about which the intermediate portion of a flexible cable 158 is wound or wrapped, and the ends of this cable extend rearwardly from the opposite sides of the drum surface 157 about the guide sheaves 156 and the ends of the cable are fastened at 159 to the conveyor frame. Thus, when liquid under pressure is properly supplied to the cylinders 150 the tail conveyor may be swung horizontally in one direction or the other as desired, and by trapping liquid within the cylinders the tails conveyor may be firmly held in adjusted position.

Figure 5:
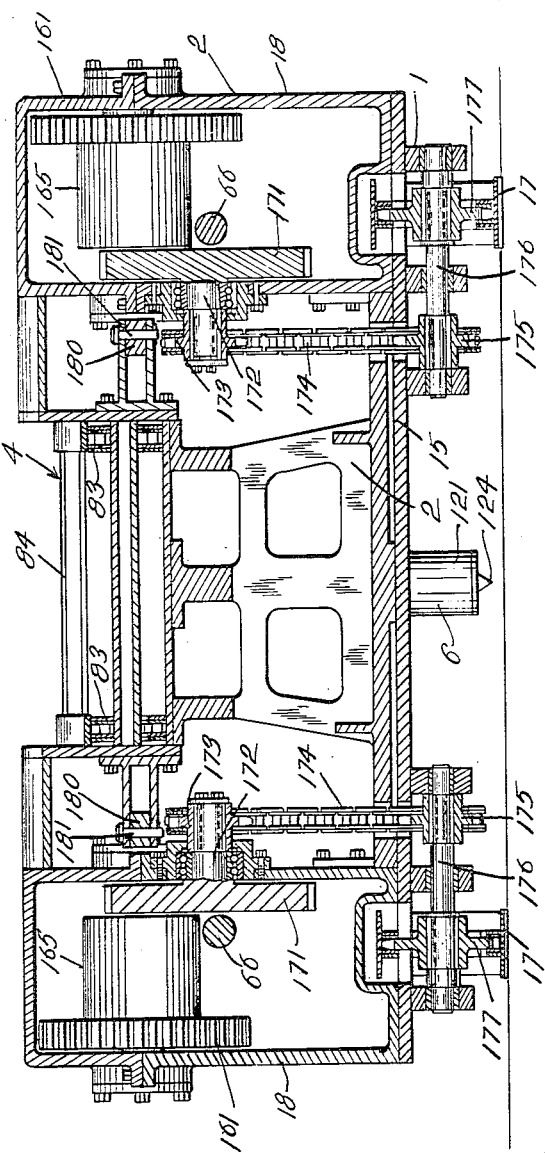
Fig. 5 is an enlarged cross section taken on line 5—5 of Fig. 4.

The crawler treads are driven by the motors 13 and the tread driving means comprises spur pinions 160 (Fig. 3) respectively secured to the shafts 69. The drive gearings for the treads are identical and each includes a spur gear 161 (see also Fig. 5), which meshes with and drives a similar spur gear 162, as shown in Fig. 8. These intermeshing spur gears 161 and 162 revolve in relatively opposite directions and are mounted on parallel transverse shafts 163 and 164 respectively, suitably journaled in bearings supported within the side housings 18. The hubs 165 of these spur gears have housed therein a spring released friction disk clutch 166 provided with a clutch shifter 167 having an operating rod 168 extending axially out through the shaft so that the gears may be selectively connected to the shafts to effect drive thereof. Formed on the shafts 163 and 164 are spur pinions 169 and 170 respectively, which mesh with a large spur gear 171. As shown in Fig. 5, the spur gears 171 are formed integral with aligned cross shafts 172 suitably journaled in bearings supported at the inner sidewalls of the side housings 18 and keyed to these shafts are chain sprockets 173, connected by endless drive chains 174 to chain sprockets 175, keyed to aligned cross shafts 176 suitably journaled in bearings supported by the base frame 15. Keyed to these shafts are chain sprockets 177 which engage and drive the crawler tread chains 17. The operating means for each pair of friction clutches comprises an elongated lever 180 pivoted at 181 on the base frame and having a handle 182 conveniently located at the side of the base of the apparatus. By swinging the levers 180, the operating rods 168 may be moved to effect application of one clutch and to permit spring release of the other clutch so that the crawler treads may each be driven at the same speed in either direction. Thus, by independently controlling the drives for the crawler treads the latter may be driven and controlled to effect propulsion and steering of the base in a well-known manner. As mentioned above, when the central floor jack 6 is lowered, the crawler treads may be properly controlled to effect turning of the base about the jack thereby to turn the disintegrating head mechanism laterally into different radially located operating positions.

Now referring to the hydraulic fluid system shown diagrammatically in Fig. 18, it will be observed that driven by one of the motors 13 is a pump 185 having its suction side connected by a conduit 186 to a liquid tank 187 herein mounted at one side of the base frame. The discharge side of the pump is connected by conduit 188 with the pressure passage of a valve box 189 of a conventional control valve mechanism which is desirably mounted on the top of the liquid tank 187, as shown in Figs. 1 and 2. The discharge passage of this valve box is connected by a return conduit 190 back to the tank. This valve box has parallel bores containing a series of manually operable rotary control valves of a conventional design, these valves respectively designated 191, 192, 193, 194 and 195 and each having an operating handle. A branch supply conduit 196 leads from the conduit 188 to the pressure passage of a valve box 197 of a conventional control valve mechanism, herein conveniently arranged on the base in adjacency to the valve box 189, and the discharge passage of this second valve box is connected by a branch conduit 198 to the return conduit 190. The bores of this second valve box contain similar conventional manually operable rotary control valves 199 and 200 each having an operating handle.

The bore containing the valve 191 is connected by conduits 201 and 202 to the swing cylinders 150 for the tail conveyor, while the bore containing the valve 192 is connected by conduits 203 and 204 to the opposite ends of the cylinder 121 of the central floor jack 6. The bore containing the valve 193 is connected by branched conduits 205 and 206 to the opposite ends of the tilt cylinders 108 of the jacks 12 for tilting the shrouding means 8 about its pivot, while the bore containing the valve 194 is connected by branched conduits 207 and 208 to the opposite ends of the cylinders 101 of the jacks 10 for swinging the disintegrating head mechanism 3 about its pivot 11. Branch conduits 209 and 210 lead from the conduits 207 and 208 respectively, the opposite ends of the cylinders 115 of the roof jacks 7. The bore containing the valve 195 is connected by conduits 211 and 212 with the passages 50 for conducting liquid under pressure to the bore 45 containing the piston 46 for tilting the intermediate wheels 36 of the head mechanism. The bore containing the valve 199 of the second valve box is connected by a conduit 213 to the remote ends of the cylinder 73 of the operating means for the clutches 70 for the side chains of the head mechanism, while the bore containing the valve 200 is connected by branched conduits 214 to the remote ends of the actuating cylinders 89 for the conveyor clutches 85. Evidently, the valve 195, instead of being operator controllable, may be actuated periodically by automatic means, so that the intermediate wheels 36 may be automatically tilted at proper intervals, wholly without manual intervention.

Figure 15:
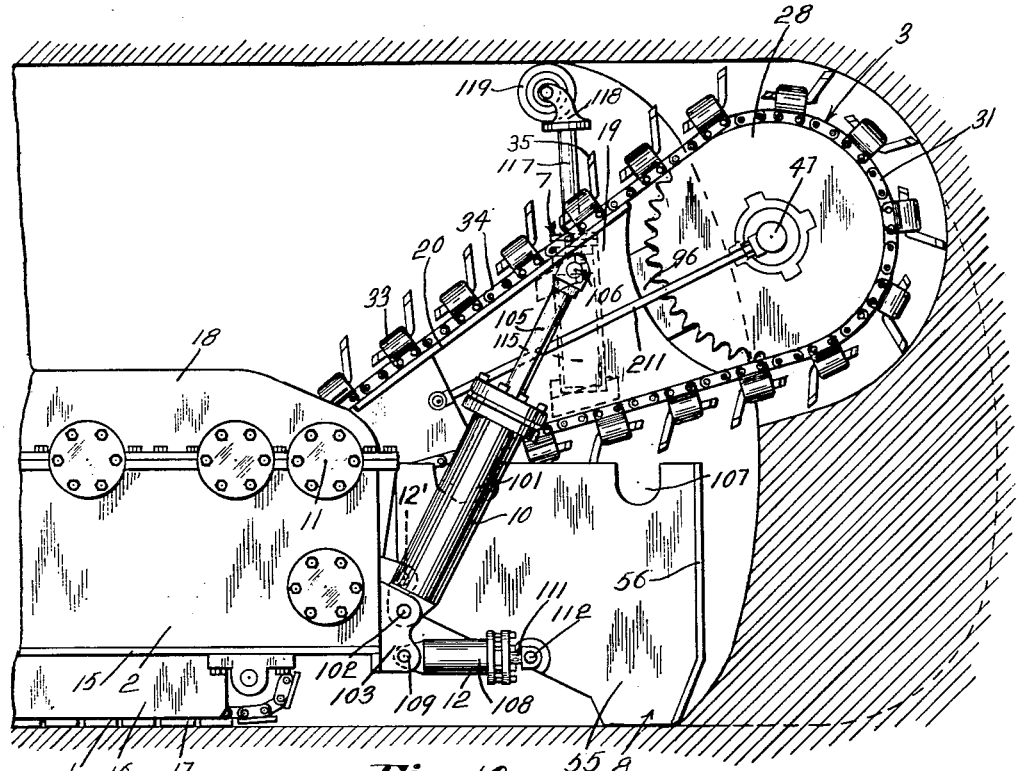
Fig. 15 is a fragmentary side elevational view of the apparatus, showing the disintegrating head mechanism in raised sumped position near the mine roof.
Figure 16:
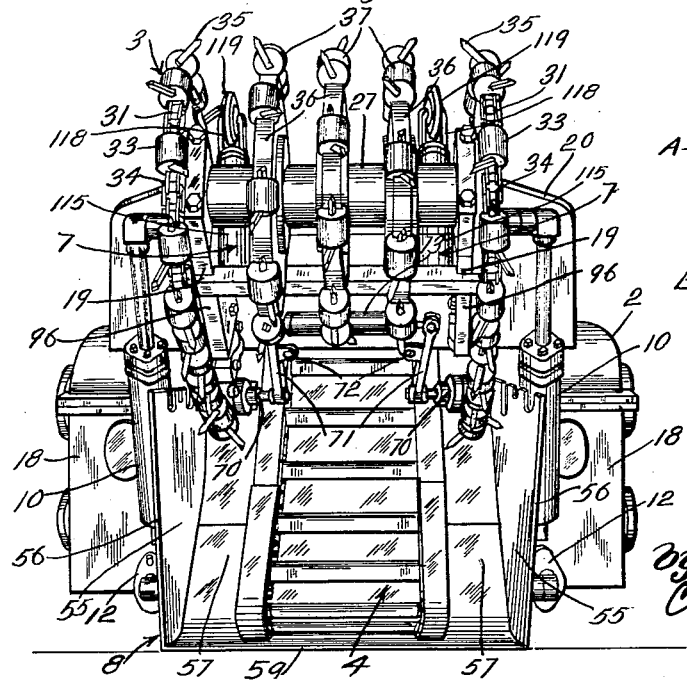
Fig. 16 is a front end elevational view of the apparatus shown in Fig. 15.
Figure 17:
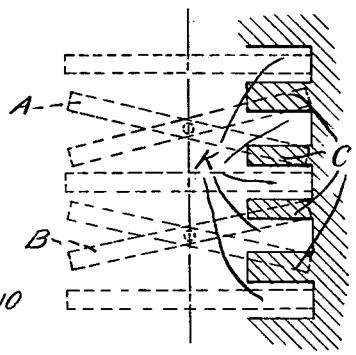
Fig. 17 is a diagrammatic section taken through the face of a mine vein, showing the mode of operation of the core breakers.

The general mode of operation of the improved mining and loading apparatus is as follows: The apparatus may be trammed about the mine and positioned with respect to the work by the endless crawler treads 17. When the working place is reached liquid under pressure may be supplied to the jack cylinders 101 and 108 under the control of the valves 194 and 193 to effect swinging of the disintegrating head mechanism 3 upwardly to bring its outer effective portion up to the roof level, to extend the roof jacks 7 to bring the caster wheels 119 against the roof and to lower the pan of the shrouding means 8 down against the floor, and thereafter liquid is trapped in the jack cylinders 101, 115 and 108 to lock the disintegrating head mechanism, the roof jacks and the shrouding means in adjusted position. When the head mechanism is so positioned at the roof level, the crawler treads 17 may be operated to effect sumping of the outer portion of the head mechanism into the mine vein, and during the sumping operation, the caster wheels 119 of the roof jacks ride along the roof, as shown in Fig. 15, thereby to prevent the head mechanism from crowding upwardly into the roof. When the head mechanism 3 is in sumped position, as shown in Fig. 15, fluid may be supplied to the cylinders 101 of the swing jacks 10 to effect downward swing of the disintegrating head mechanism to effect dislodging and disintegration of the mineral at the face. Concurrently with the initiation of downward swing of the head mechanism, the pistons of the jacks 7 are operated to retract the caster wheels. Upon completion of the disintegration of a vertical segment of the face, the piston of the central floor jack 6 may be lowered into contact with the floor under the control of the valve 192 and the crawler treads may be operated to effect turning of the base about the stationary jack center thereby to move the disintegrating head mechanism 3 arcuately into an adjacent radially disposed disintegrating position and thereafter the head mechanism may be again swung upwardly to the roof, sumped into the mine vein, and swung downwardly to complete its cycle. These operations are repeated until a wide section of mineral is dislodged completely across the face of the mine vein. When the head mechanism is sumped its full depth into the mine vein the front surfaces 56 of the shrouding means 8 may move up close to or even into engagement with the face so that the flying of the disintegrated mineral is substantially avoided and the disintegrated mineral is directed rearwardly toward the front conveying means 4. As the head mechanism 3 is advanced into the mineral, the side cutter chains 31 and the parallel cutter wheels 36 cooperate to form parallel vertical slots or kerfs K in the mineral thereby forming parallel cores C of mineral between the slots, as shown diagrammatically in Fig. 17, and at intervals the operator may manipulate the control valve 195 to control the supply of liquid under pressure to the cylinder bore 45 to shift the piston 46 axially to effect tilting of the intermediate cutter disks or wheels to cause wobbling thereof thereby to effect disintegration of the cores, in the manner shown. Thus, the intermediate wobble disks or wheels may dislodge the cores of mineral between the kerfs and each wheel, when in wobbling position, first engages one core and then the other in the manner indicated by the crossed dotted lines at A and B in Fig. 17. As the disintegrating head mechanism 3 swings downwardly, the vertical sides 19 of the head frame cooperate with the vertical sides 55 of the shrouding means 8 to minimize flying of the disintegrated mineral and to direct the disintegrated mineral rearwardly toward the front elevating conveying means 4 and the latter moves the disintegrated mineral rearwardly to discharge into the hopper 136 at the swivel of the tail conveyor 5. The endless flight conveyor 137 of the tail conveyor receives the disintegrated mineral discharged into the hopper and moves the same rearwardly to a convenient point of delivery at the rear end of the apparatus. By suitably operating the cylinders 150 of the swinging mechanism, the tail conveyor may be swung horizontally into the desired angular position.

As a result of this invention an improved mining and loading apparatus is provided having improved disintegrating and loading means whereby the mineral of a solid mine vein may be efficiently dislodged and loaded out in a substantially continuous manner. By the provision of the improved disintegrating head mechanism embodying the series of parallel cutting devices for forming parallel slots in the mineral together with the improved means for moving certain of the cutting devices out of parallelism for effecting disintegration of the cores between the slots, the mineral of a solid vein may be rapidly and efficiently dislodged. The improved shrouding means which cooperates with the disintegrating head mechanism serves to prevent flying of the disintegrated mineral and to confine the disintegrated mineral within the apparatus thereby to eliminate the need for a separate floor clean-up means. The improved shrouding means cooperates with the disintegrating head mechanism to direct the disintegrated mineral toward the front conveying means. By the provision of the roof jacks for the disintegrating head mechanism, undesired crowding of the latter into the roof is prevented; and, by the provision of the central floor jack, the disintegrating head mechanism may be readily swung laterally into different operating positions. The novel disposition of the motors rearwardly of the crawler treads of the base provides for better balance of the apparatus. The apparatus is not only rapid and efficient in operation but is also simple and rugged in design and extremely well balanced. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a mining and loading apparatus, the combination comprising a mobile base, a horizontal frame structure carried by said base, a mine vein disintegrating head mechanism pivotally mounted on the forward portion of said frame structure to swing in vertical planes with respect thereto for dislodging and disintegrating the mineral of a solid mine vein, shrouding means pivotally mounted on the forward portion of said frame structure and having its sides extending upwardly along the outer sides of said head mechanism and a bottom portion extending transversely between said sides, said shrouding means cooperating with said disintegrating head mechanism for confining the disintegrated mineral within the apparatus as it is disintegrated and moved rearwardly by said head mechanism, conveying means carried by said frame structure and having a forward receiving portion extending forwardly and downwardly into adjacency to said head mechanism and within said shrouding means, said bottom portion having the forward receiving portion of said conveying means mounted thereon, and separately operable means for swinging said head mechanism and said shrouding means about their respective pivots and for holding the same in adjusted positions.

2. A mining and loading apparatus as set forth in claim 1 wherein said sides of said shrouding means are upright and said bottom portion extends transversely between said sides, said sides extending vertically close to the outer sides of said head mechanism at least when the latter is in lowered position, said bottom portion extending transversely beneath said head mechanism, said shrouding means substantially enclosing the rearward portion of said head mechanism at its lower portion and partially at its sides, the active disintegrating portion of said head mechanism projecting forwardly from said shrouding means, and said shrouding means serving to direct the disintegrated mineral moved rearwardly by said head mechanism toward said receiving portion of said conveying means, said separately operable swinging means disposed outside of said upright sides of said shrouding means.

3. A mining and loading apparatus as set forth in claim 1 wherein said bottom portion of said shrouding means provides a forward floor-engaging pan along which said forward receiving portion of said conveying means is guided, said pan extending forwardly beneath said head mechanism beyond the sides thereof and having a forward penetrating edge.

4. In a mining and loading apparatus, the combination comprising a mobile base movable over a mine floor, a horizontal frame structure carried by said base and rigidly secured to the latter whereby turning of said base effects horizontal swinging of said frame structure therewith, a mine vein disintegrating head mechanism pivotally mounted on the forward portion of said frame structure to swing in vertical planes with respect thereto for dislodging and disintegrating the mineral of a solid mine vein, conveying means carried by said frame structure and extending into adjacency to said head mechanism for receiving the disintegrated mineral discharged from said head mechanism, propelling and steering means for said base and operable to effect turning of said base to swing said frame structure horizontally thereby in unison therewith to vary the lateral operating position of said integrating head mechanism, and means engaging the mine floor for providing a fixed pivotal point for said frame structure for guiding the latter during swinging thereof horizontally with said base while the latter remains entirely supported by the mine floor.

5. A mining and loading apparatus as set forth in claim 4 wherein said means for providing a fixed pivotal point for said frame structure comprises a power operated floor jack mounted on said base centrally thereof and having a pointer with a mine floor and penetrating the floor surface for centering said base during such turning movement thereof.

6. In a mining and loading apparatus, the combination comprising a mobile base having propelling means, a frame structure overlying and mounted on said base, a mine vein disintegrating head mechanism pivotally mounted on said frame structure to swing in vertical planes with respect thereto to effect disintegration of the mineral of a solid mine vein, said base propelling means, when said head mechanism is in raised position at the roof level, moving the apparatus forwardly to sump said head mechanism into the mineral, power operated devices for swinging said disintegrating head mechanism about its pivot, and roof jack devices mounted on said disintegrating head mechanism and engageable with the mine roof for preventing crowding of said head mechanism upwardly into the roof during sumping of said head mechanism as aforesaid.

7. In a mining and loading apparatus as set forth in claim 6 wherein control means is provided for said power operated devices and said roof jack devices for effecting concurrent operation of said devices to effect both swing of said head mechanism about its pivot and movement of said jack devices.

8. In a mining and loading apparatus, the combination comprising a mobile base, a frame structure mounted on said base, a mine vein disintegrating head mechanism pivotally mounted on the forward portion of said frame structure to swing in vertical planes for dislodging the mineral of a solid mine vein, fluid operated jacks for swinging said head mechanism about its pivot, a floor jack for centering said base whereby said base may be turned to swing said frame structure horizontally to vary the lateral operating position of said head mechanism, and fluid operated roof jacks mounted on said head mechanism and engageable with the roof for supplementing said swing jacks during a portion of the downward swing of said head mechanism.

9. In a mining and loading apparatus as set forth in claim 8 wherein fluid pumping means is mounted on said base, and remote control valve means are provided on said base for controlling the supply of fluid under pressure from said pumping means to said several jacks.

10. A mining and loading apparatus as set forth in claim 9 wherein motors are mounted at the opposite sides of the rearward portion of said frame structure rearwardly of said base for driving said head mechanism and wherein one of said motors drives said pumping means.

11. In a mining and loading apparatus, the combination comprising a mobile base, a frame structure carried by said base, a mine vein disintegrating head mechanism pivotally mounted on said frame structure to swing in vertical planes with respect thereto, means for swinging said head mechanism about its pivot, said head mechanism when in its raised position at the roof level adapted to be moved forwardly to effect sumping thereof into the mine vein, and a roof jack mechanism carried by said head mechanism and having roof engaging means in moving contact with the mine roof and serving to prevent upward crowding of said head mechanism into the roof during the sumping operation.

12. A mining and loading apparatus as set forth in claim 11 wherein said roof jack mechanism is extensible and said roof engaging means comprises a wheel, and said jack mechanism when extended effecting movement of said wheel into contact with the roof.

13. A mining and loading apparatus as set forth in claim 11 wherein said swinging means for said head mechanism and said jack mechanism are fluid actuated, and means is provided for coordinating said jack mechanism with said swinging means whereby, when said head mechanism is swung upwardly, said jack mechanism is concurrently operated.

14. In a mining and loading apparatus, the combination comprising a support, disintegrating head mechanism pivotally mounted on said support for swinging movement in vertical planes to effect dislodgment and disintegration of the mineral of a solid mine vein, a frame pivotally mounted on said support and having upright side portions extending along the outer sides of said head mechanism and a connecting horizontal bottom portion underlying said head mechanism, said frame providing an enclosure for the sides and bottom of said head mechanism for confining the dislodged and disintegrated mineral for movement rearwardly by said head mechanism, a power device for tilting said frame, and extensible power devices connected between said support and said head mechanism for swinging the latter, said upright side portions of said frame disposed between the outer sides of said head mechanism and said extensible power devices.

15. A mining and loading apparatus as set forth in claim 14 wherein said upright side portions of said enclosure-providing frame extend nearly to the top of said head mechanism when the latter is in lowered position about its pivot.

16. A mining and loading apparatus as set forth in claim 14 wherein said extensible power devices have pivotal connections with the sides of said head mechanism and said upright side portions of said frame being notched at their upper portions to receive portions of said pivotal connections when said head mechanism is in lowered position.

17. In combination, a support, propelling means for said support, a disintegrating head mechanism for dislodging and disintegrating the mineral of a solid mine vein, means for pivotally mounting said head mechanism on said support to swing in vertical planes relative thereto, driving means for said propelling means including drive control clutches, and operating means for said clutches including shiftable clutch operators coaxial with the pivot of said head mechanism.

18. In combination, a support, a disintegrating head mechanism for dislodging and disintegrating the mineral of a solid mine vein, means for pivotally mounting said head mechanism on said support to swing in vertical planes, said head mechanism comprising parallel side disintegrating chains movable in parallel vertical orbits and orbitally movable disintegrating elements arranged between and driven by said side chains, and a transverse upper plate of substantial width laterally and extent longitudinally of said head mechanism and over which the top runs of said disintegrating chains travel, said transverse plate carried at the upper portion of and swingable in vertical planes with said head mechanism, said side chains and said orbitally moving elements traveling in a direction with their forward portions moving downwardly and rearwardly during the dislodging and disintegrating operation and said plate at its underside engaging the disintegrated mineral discharged rearwardly and upwardly from said head mechanism and directing the same downwardly.

19. The combination as set forth in claim 18 wherein a large hopperlike frame is carried by said support and extends horizontally beneath and vertically along the outer sides of said head mechanism for confining the disintegrated mineral for movement in a rearward direction.

20. The combination as set forth in claim 19 wherein extensible power devices are located outwardly of the vertical sides of said hopperlike frame and are connected between said support and said head mechanism and said hopperlike frame, said transverse upper plate overlying the connections of said extensible power devices with the sides of said head mechanism.

21. The combination as set forth in claim 14 wherein said enclosure-providing frame has upright forward abutting surfaces at its sides engageable with the face of a mine vein during the dislodging and disintegrating operation.

22. In a mining and loading apparatus, the combination comprising a mobile base, a horizontal frame structure carried by said base, a mine vein disintegrating head mechanism pivotally mounted on the forward portion of said frame structure to swing in vertical planes with respect thereto for dislodging and disintegrating the mineral of a solid mine vein, said head mechanism moving the disintegrated mineral rearwardly away from the working face, shrouding means pivotally mounted on the forward portion of said frame structure and having its sides extending upwardly along the outer sides of said head mechanism, said shrouding means cooperating with said disintegrating head mechanism for confining the disintegrated mineral within the apparatus as it is disintegrated and moved rearwardly by said head mechanism, said sides of said shrouding means extending substantially upright, said shrouding means also including a bottom portion extending transversely beneath said head mecahnism between said upright sides thereby substantially to enclose the rearward portion of said head mechanism at its lower portion and partially at its sides when said head mechanism is in lowered position, said head mechanism having its active disintegrating portion projecting forwardly in advance of said shrouding means, and conveying means carried by said frame structure and extending into adjacency to said head mechanism and said shrouding means for receiving the disintegrated mineral discharged from said head mechanism, said conveying means having its forward receiving portion mounted on said bottom portion of said shrouding means, said shrouding means serving to direct the disintegrated mineral moved rearwardly by said head mechanism toward said receiving portion of said conveying means, said bottom portion of said shrouding means having longitudinal side surfaces intermediate said upright sides at the opposite sides of said conveying means, said disintegrating head mechanism including side disintegrating chains which extend rearwardly of the pivot of said head mechanism, said side chains cooperating with said side surfaces, when said head mechanism is in lowered position, to move the disintegrated mineral accumulated within said shrouding means rearwardly to discharge onto said conveying means at the rear of said head mechanism.

23. In a mining and loading apparatus, the combination comprising a mobile base, a horizontal frame structure carried by said base, a mine vein disintegrating head mechanism pivotally mounted on the forward portion of said frame structure to swing in vertical planes with respect thereto for dislodging and disintegrating the mineral of a solid mine vein, said head mechanism moving the disintegrated mineral rearwardly away from the working face, shrouding means pivotally mounted on the forward portion of said frame structure and having its sides extending upwardly along the outer sides of said head mechanism and its bottom portion between said sides underlying said head mechanism, said shrouding means cooperating with said disintegrating head mechanism for confining the disintegrated mineral within the apparatus as it is disintegrated and moved rearwardly by said head mechanism, the pivotal axes of said head mechanism and said shrouding means being disposed parallel to a common straight line extending across said frame structure, conveying means carried by said frame structure and extending into adjacency to said head mechanism within said shrouding means with the forward receiving portion of said conveying means mounted on said bottom portion of said shrouding means, means for swinging said head mechanism about its pivot, and means for tilting said shrouding means on its pivot when said head mechanism is raised above the floor level.

24. In combination, a support, propelling means for said support, a disintegrating head mechanism for dislodging and disintegrating the mineral of a solid mine vein, means for pivotally mounting said head mechanism on said support to swing in vertical planes relative thereto, and driving means for said propelling means including a drive element coaxial with and extending through the pivot of said head mechanism, a drive control clutch for said drive element and operating means for said clutch including a shiftable clutch operator, said clutch and said operator both arranged coaxially with said drive element.

25. In a mining apparatus, the combination comprising a mobile base having supporting and propelling means for determining the path of travel of said base over the mine floor, a mining instrumentality mounted on said base for adjustment in a vertical direction relative thereto, and a roof-engaging device carried by said mining instrumentality and engageable with the mine roof to prevent upward crowding of the mining instrumentality into the roof during the mining operation, said roof-engaging device moving along the mine roof as said base is propelled over the mine floor.

26. A mining apparatus as set forth in claim 25 wherein said roof-engaging device has a contact with the roof providing for ready angular adjustment in horizontal planes in response to changes in direction of base movement.

27. In a mining and loading apparatus, the combination comprising a mobile base movable over a mine floor, a horizontal frame structure carried by said base and rigidly secured to the latter whereby turning of said base effects horizontal swinging of said frame structure therewith, a mine vein disintegrating head mechanism mounted on the forward portion of said frame structure for dislodging and disintegrating the mineral of a solid mine vein, conveying means carried by said frame structure and extending into adjacency to said head mechanism for receiving the disintegrated mineral dislodged by said head mechanism, propelling and steering means for said base and operable to effect turning of said base to swing said frame structure horizontally thereby in unison therewith to vary the lateral operating position of said disintegrating head mechanism, and means engaging the mine floor for providing a fixed pivotal point for said frame structure for guiding the latter during swinging thereof horizontally with said base while the latter remains entirely supported by the mine floor.

28. A mining and loading apparatus as set forth in claim 27 wherein said means for providing a fixed pivotal point for said frame structure comprises a power operated floor jack mounted on said base centrally thereof and having a pointer with a mine floor and penetrating the floor surface for centering said base during such turning movement thereof.

(References on following page)

References Cited in the file of this patent

UNITED STATES PATENTS

| | | |
|---|---|---|
| Re. 17,305 | Levin | May 28, 1929 |
| Re. 17,467 | Crawford | Oct. 22, 1929 |
| 1,128,880 | Jamison | Feb. 16, 1915 |
| 1,151,360 | Hovland | Aug. 24, 1915 |
| 1,295,173 | Joy | Feb. 25, 1919 |
| 1,431,857 | Willcox | Oct. 10, 1922 |
| 1,502,143 | Kell | July 22, 1924 |
| 1,505,476 | London | Aug. 19, 1924 |
| 1,620,668 | Lipps | Mar. 15, 1927 |
| 1,747,162 | Davis | Feb. 18, 1930 |
| 1,749,968 | Blair | Mar. 11, 1930 |
| 1,811,927 | Halleck | June 30, 1931 |
| 2,008,817 | Cartlidge | June 23, 1935 |
| 2,024,458 | Kraft | Dec. 17, 1935 |
| 2,030,063 | Halleck | Feb. 11, 1936 |
| 2,269,781 | Osgood | Jan. 13, 1942 |
| 2,287,230 | Cartlidge | June 23, 1942 |
| 2,329,875 | Cartlidge | Sept. 21, 1943 |
| 2,415,217 | Osgood | Feb. 4, 1947 |
| 2,418,573 | Cartlidge | Apr. 8, 1947 |
| 2,520,040 | Levin | Aug. 22, 1950 |
| 2,531,072 | Merchant | Nov. 21, 1950 |